No. 703,132. Patented June 24, 1902.
A. JOHNSON.
BAND CUTTER AND FEEDER FOR THRESHING MACHINES.
(Application filed May 31, 1901.)
(No Model.) 3 Sheets—Sheet 1.
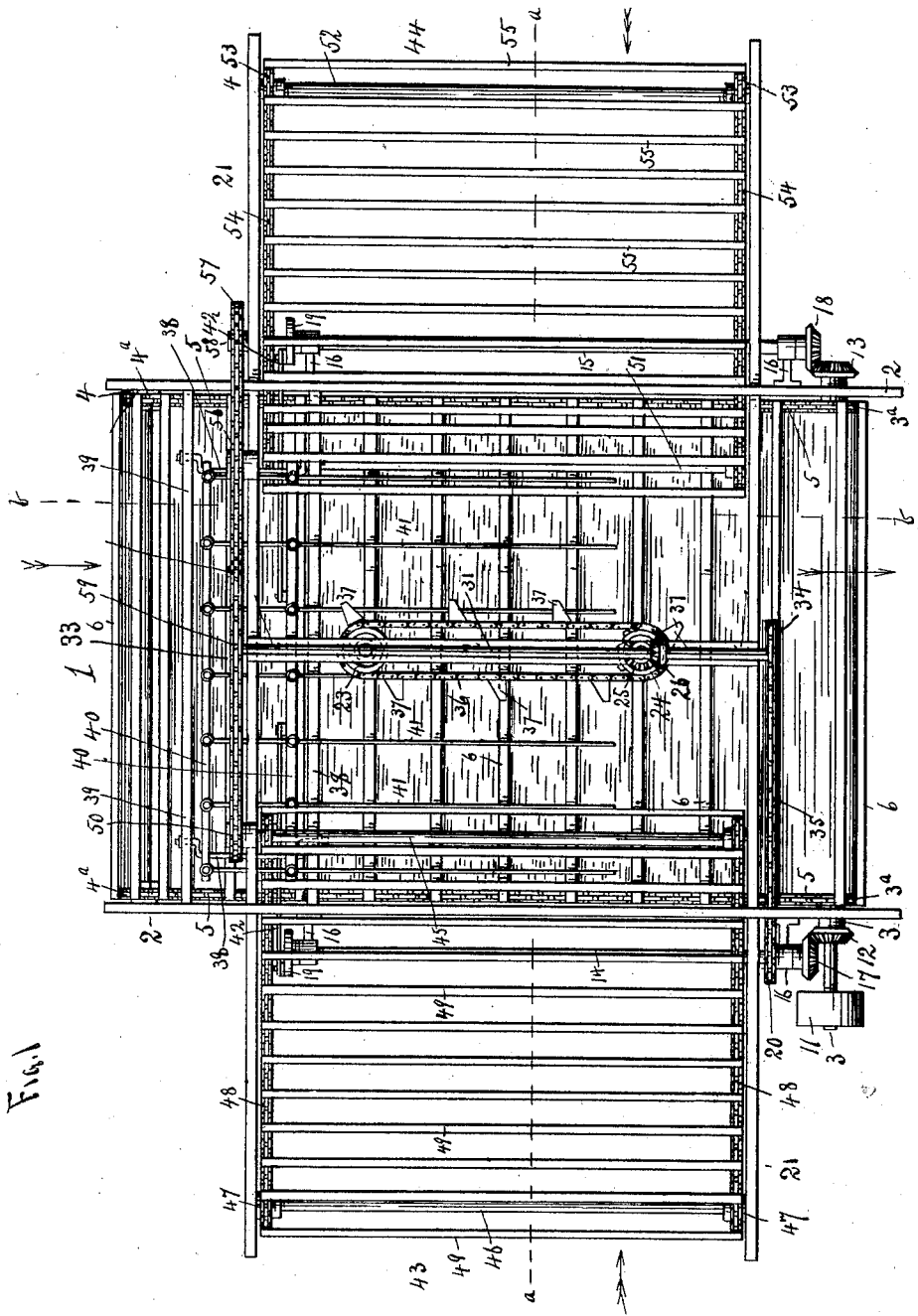
Witnesses
C. H. Woodward
J. W. Garner
Augustus Johnson, Inventor
By C. A. Snow & Co.
Attorneys

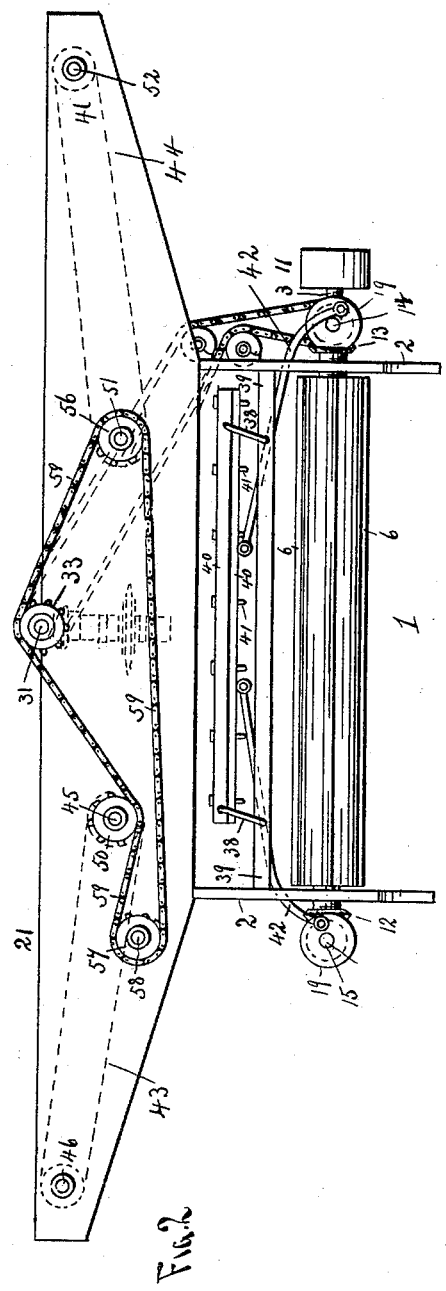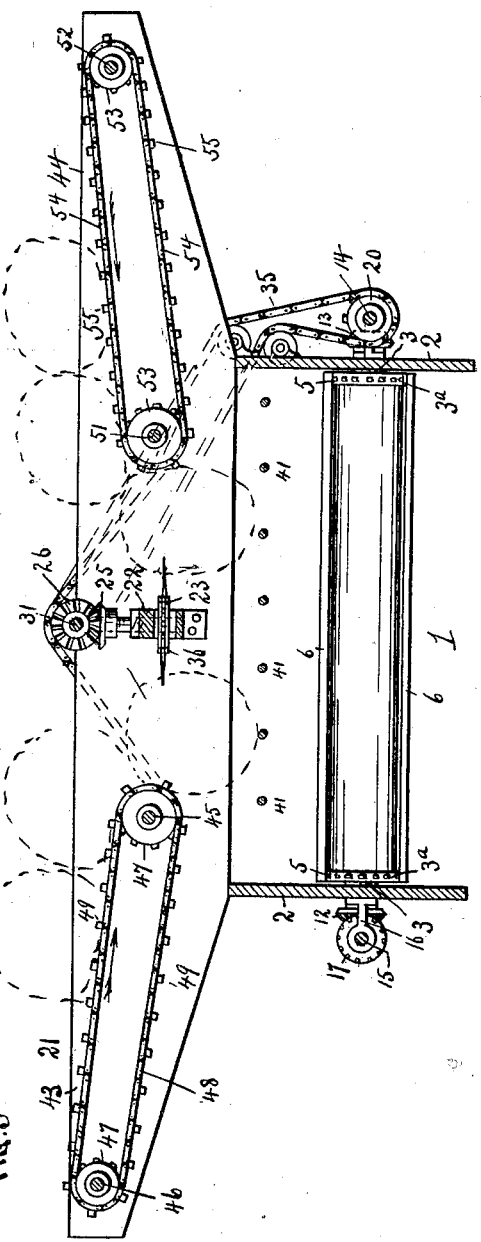

No. 703,132. Patented June 24, 1902.
A. JOHNSON.
BAND CUTTER AND FEEDER FOR THRESHING MACHINES.
(Application filed May 31, 1901.)
(No Model.) 3 Sheets—Sheet 3.
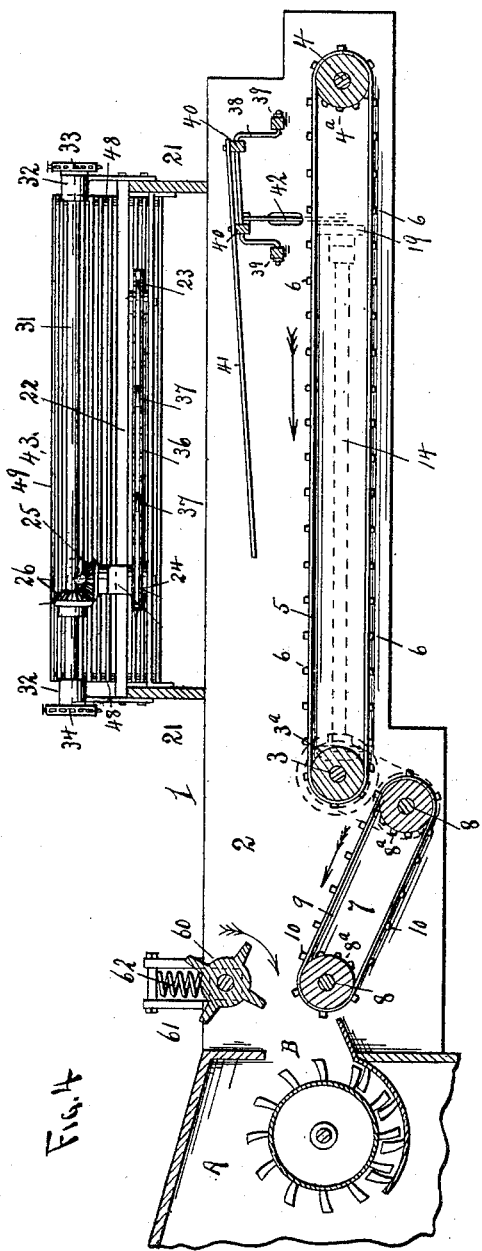
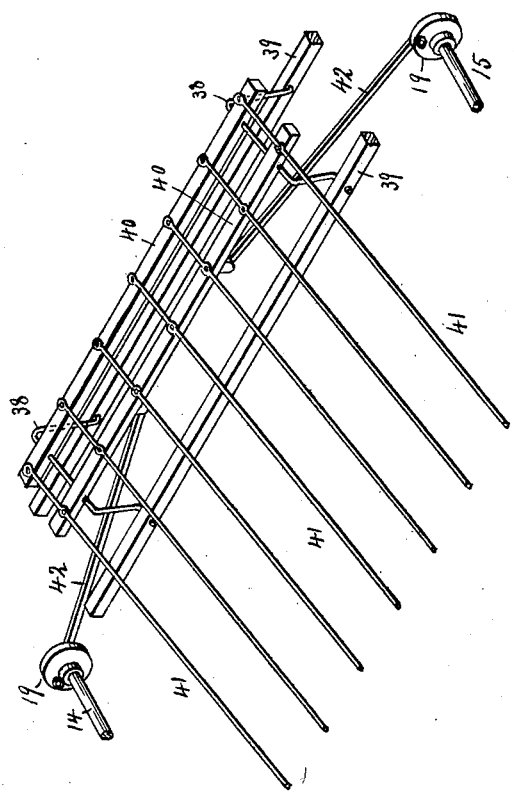
Witnesses
C. H. Woodward
J. W. Garner
Augustus Johnson, Inventor
By C. A. Snow & Co.
Attorneys

UNITED STATES PATENT OFFICE.

AUGUSTUS JOHNSON, OF FALUN, KANSAS.

BAND-CUTTER AND FEEDER FOR THRESHING-MACHINES.

SPECIFICATION forming part of Letters Patent No. 703,132, dated June 24, 1902.

Application filed May 31, 1901. Serial No. 62,627. (No model.)

*To all whom it may concern:*

Be it known that I, AUGUSTUS JOHNSON, a citizen of the United States, residing at Falun, in the county of Saline and State of Kansas, have invented a new and useful Band-Cutter and Feeder for Threshing-Machines, of which the following is a specification.

My invention is an improved band-cutter and feeder for threshing-machines; and it consists in the peculiar construction and combination of devices hereinafter fully set forth and claimed.

In the drawings, Figure 1 is a top plan view of a band-cutter and feeder for threshing-machines constructed in accordance with my invention. Fig. 2 is an end elevation of the same. Fig. 3 is a vertical sectional view taken on a plane indicated by the line $a\,a$ in Fig. 1. Fig. 4 is a vertical longitudinal sectional view taken on a plane indicated by the line $b\,b$ in Fig. 1 and showing the arrangement of the band-cutter and feeder with reference to the threshing mechanism. Fig. 5 is a detail perspective view of the scattering-grate.

In the embodiment of my invention I provide a feeder-frame 1, which comprises the parallel sides 2 and is adapted to be attached to the front end of a threshing-machine. In Fig. 4 of the drawings a portion of a threshing-machine is indicated at A. In the sides 2 are journaled a pair of shafts 3 4, which are respectively provided with sprocket-wheels $3^a$ and $4^a$. Endless sprocket-chains 5 connect said sprocket-wheels, and said sprocket-chains are connected together by transversely-disposed slats 6, which are disposed at suitable distances apart. The said chains and slats constitute an endless traveling main conveyer. At the inner end of the main conveyer, between the same and the mouth B of the threshing-machine casing, is disposed an auxiliary conveyer 7. The same comprises a pair of shafts 8, sprocket-wheels $8^a$ on said shafts, endless sprocket-chains 9, which connect said sprocket-wheels, and slats 10, which connect said sprocket-chains. The said auxiliary conveyer is inclined at a suitable angle and extends upwardly to the threshing mechanism, as shown in Fig. 4, and the lower side thereof is under the discharge side of the main conveyer, so that the grain falls from the latter onto said auxiliary conveyer. The arrows in Fig. 4 indicate the direction of movement of said conveyers. The shaft 3 is provided at one end with a power-pulley 11. Said shaft is further provided on opposite sides of the frame 1 with miter gear-wheels 12 13. Shafts 14 15 are journaled in bearings 16 on opposite sides of the frame 1, said shafts being disposed longitudinally of said frame and in a horizontal position. At the rear end of shaft 14 is a miter gear-wheel 17, that engages the gear 12. Shaft 15 has at its rear end a miter gear-wheel 18, that engages the gear 13. Thereby power is conveyed from shaft 3 to shafts 14 15, as will be understood. Each of said shafts 14 15 has at its front end a crank-wheel 19. The shaft 14 is further provided with a sprocket-wheel 20.

A hopper 21 is disposed transversely on the frame 1, and the ends of said hopper-frame project beyond the sides of said frame 1. A bar 22 connects the central portions of the sides of the hopper-frame 21 and is disposed at a suitable distance above the central portion of the main conveyer. The said bar 22 carries the bearings for a pair of sprocket-wheels 23 24, which are under said bar. The vertical shaft of sprocket-wheel 24 has at its upper end a miter gear-wheel 25. The same is engaged by a similar gear 26, that is fast on a shaft 31, which is journaled in bearings 32 on the sides of the hopper-frame. At the front end of said shaft 31 is a sprocket-wheel 33. At the rear end thereof is a similar sprocket-wheel 34. The latter is connected to the sprocket-wheel 20 on shaft 14 by an endless sprocket-chain 35. Thereby power is conveyed from said shaft 14 to said shaft 31, from the latter through the gears hereinbefore described to the sprocket-wheel 24, which sprocket-wheel 24 is connected to the sprocket-wheel 23 by an endless sprocket-chain 36. Said sprocket-chain is provided with a series of band-cutting knives 37. Said sprocket-chain and band-cutting knives constitute an endless traveling band-cutter, which is disposed at a suitable height above the central portion of the main conveyer.

A pair of cranked rock-shafts 38 are journaled in bearings in a pair of bars 39, which connect the sides 2 of frame 1 together and are disposed above the outer portion of the main conveyer. The said cranked rockshafts are connected together by a pair of bars 40, which are disposed transversely with relation to and above the main conveyer, and to the said bars 40 are secured the front portions of a series of scattering grate-bars 41. Thereby a scattering-grate is formed which is disposed above the main conveyer and below the endless traveling band-cutter. Said scattering-grate, as will be understood, is adapted to move back and forth in a lateral direction over the main conveyer. Motion is communicated to the said scattering-grate by pitmen 42, which connect the cranks 19 on the shafts 14 15 to one of the bars 40 of said scattering-grate, as is shown in detail in Fig. 5. The function of the scattering-grate is to support the sheaves while the bands are being cut and scatter and loosen the grain and cause the same to fall evenly onto the main conveyer, so that the grain will be evenly carried by the main conveyer to the auxiliary conveyer and by the latter delivered to the threshing mechanism. Furthermore, the scattering grate-bars serve to dispose the grain longitudinally on the main conveyer.

In opposite ends of the hopper-frame are disposed a pair of sheaf-feeding conveyers 43 44. The feeder-conveyer 43 comprises a pair of shafts 45 46, sprocket-wheels 47 on said shafts, endless sprocket-chains 48, which connect said sprocket-wheels of said respective shafts, and cross-slats 49, which connect said sprocket-chains together. The shaft 45 of feeder-conveyer 43 has at its front end a sprocket-wheel 50. The feeder-conveyer 44 comprises a pair of shafts 51 52, sprocket-wheels 53 on said shafts, endless sprocket-chains 54, which connect said sprocket-wheels of said respective shafts together, and cross-slats 55, which connect said endless sprocket-chains together. At the front end of shaft 51 is a sprocket-wheel 56. An idler sprocket-wheel 57 is journaled on a suitable spindle 58, which projects from the front side of the hopper-frame at a suitable distance to one side of the shaft 45. An endless sprocket-chain 59 connects the sprocket-wheel 53, the idler-wheel 57, and sprocket-wheel 56 together and passes under the sprocket-wheel 50. Thereby power is conveyed from the shaft 31 to the feed-conveyers 43 44, and the latter are driven in opposite directions, as is indicated by the arrows in Fig. 3. The upper leads thereof travel toward the endless traveling band-cutter, which is disposed at a point midway between said feed-conveyer. The sheaves are thrown onto said feed-conveyers and are by the latter conveyed to the band-cutter, the operation of which has been hereinbefore described. The relative disposition of the band-cutter, sheaf-conveyers 43 44, and grate is such that the sheaves while the bands thereof are being cut are on said grate and between said band-cutter and the inner sides of said sheaf-conveyers.

It will be understood from the foregoing that my improved band-cutter and feeder may be supplied with sheaves from either or both sides thereof and that the same is effective in cutting the bands and conveying the unbound grain evenly and without choking to the threshing mechanism.

A revoluble beater and feeder 60 is disposed above the upper side of the auxiliary conveyer in operative relation thereto and may be driven by any suitable means. The shaft of said beater and feeder is journaled in bearings which are movable vertically in suitable guides 61. Springs 62 while serving to normally depress said bearings and the feeder and beater enable the latter to rise as grain passes under the same. Said feeder and beater, as will be understood, serve to facilitate the feeding of the grain to the threshing mechanism.

Having thus described my invention, I claim—

1. The combination of a conveyer, a scattering-grate disposed above the same and adapted for reciprocating movement, transversely-oscillating shafts having cranks supporting and connected by said grate, and means to impart reciprocating movement to the latter, and thereby impart oscillatory motion to said crank-shafts, substantially as described.

2. The combination of a conveyer, a scattering-grate disposed above the same, a band-cutting mechanism above said grate and a sheaf-conveyer to convey sheaves to said band-cutting mechanism, the relative disposition of said cutting mechanism, grate and sheaf-conveyer being such that the sheaves, while the bands thereof are being cut, are on said grate and between said cutting mechanism and sheaf-conveyer, substantially as described.

3. The combination of a conveyer, a scattering-grate above the same, an endless traveling band-cutter, horizontally disposed above said grate, and a plurality of sheaf-conveyers with their inner portions opposite the leads of said band-cutter, the relative dispositions of said grate, band-cutter and sheaf-conveyers being such that the sheaves, while the bands thereof are being cut are on said grate and between said band-cutter and sheaf-conveyers, substantially as described.

In testimony that I claim the foregoing as my own I have hereto affixed my signature in the presence of two witnesses.

AUGUSTUS JOHNSON.

Witnesses:
  OLOF FORSSE,
  T. LAGERSTROM.